US012007823B2

(12) United States Patent
Rajagopal et al.

(10) Patent No.: US 12,007,823 B2
(45) Date of Patent: Jun. 11, 2024

(54) POWER MANAGEMENT OF A PROCESSOR AND A PLATFORM IN ACTIVE STATE AND LOW POWER STATE

(71) Applicant: Intel Corporation, Santa Clara, CA (US)

(72) Inventors: Pannerkumar Rajagopal, Bangalore (IN); Raghavendra N, Bangalore (IN); Ovais Pir, Srinagar (IN); Prakash Pillai, Bangalore (IN); Sagar C. Pawar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/702,504

(22) Filed: Mar. 23, 2022

(65) Prior Publication Data

US 2022/0391003 A1  Dec. 8, 2022

(30) Foreign Application Priority Data

Jun. 4, 2021 (IN) .............................. 202141024849

(51) Int. Cl.
*G06F 1/32* (2019.01)
*G06F 1/3231* (2019.01)
(52) U.S. Cl.
CPC ................. *G06F 1/3231* (2013.01)
(58) Field of Classification Search
CPC ........................................................ G06F 1/32
See application file for complete search history.

(56) References Cited

U.S. PATENT DOCUMENTS

| 5,623,234 | A | * | 4/1997 | Shaik | ................. H03L 7/06 331/49 |
|---|---|---|---|---|---|
| 2011/0314316 | A1 | | 12/2011 | Kim | |
| 2014/0281631 | A1 | | 9/2014 | Asano | |
| 2020/0026342 | A1 | | 1/2020 | Sengupta et al. | |
| 2021/0132769 | A1 | | 5/2021 | Parikh et al. | |

OTHER PUBLICATIONS

Extended European Search Report dated Sep. 1, 2022 for EP Application No. 22161581.8, 11 pages.

* cited by examiner

*Primary Examiner* — Paul B Yanchus, III
(74) *Attorney, Agent, or Firm* — Schwabe, Williamson & Wyatt, P.C.

(57) ABSTRACT

A power-management scheme where when a system-on-chip (SoC) is in an active state, control and monitoring logic or circuitry turns off all wake logic or circuits for various associated intellectual property (IP) blocks. Based on user defined operating system power manager (OSPM) policies, OSPM kicks off an interrupt to the control and monitoring logic or circuitry to turn off or power gate the wake logic for individual IP blocks in the SoC. As such, wake logic that are idle in active state (e.g., S0 state) and would otherwise draw power in the S0 state are now turned off, thus saving power and/or extending battery life for the system. When the SoC is in a low power state, then the control and monitoring logic or circuitry selectively turns on the wake logic for the associated IP blocks based on detected user presence for the computing system having the SoC.

19 Claims, 8 Drawing Sheets

```
Method(_PMD, 0x0, Serialized)  //Power Mode Disable Device Lists
{
    Return(DEVL)  //Return the Device list package
}
```

400

```
Method(_S0E, 0x0, Serialized)  //S0 Extended System Operational Mode Lists
{
    Return(S0EM)  //Return the package of various system operating modes in S0
}
```

Name(DEVL, Package() //Device list needs to be power managed
{
Package(){ {"\\_SB.PCI0.LPCB.H_EC.LID0"}, //LID Device
Package(){ {"\\_SB.PCI0.LPCB.H_EC.SMKB"}, //Scan Matrix Keyboard
Package(){ {"\\_SB.PCI0.I2C0.TRPD"}, //Track PAD Device
Package(){ {"\\_SB.PCI0.I2C1.TRBL"}, //Track Ball Device
Package(){ {"\\_SB.PCI0.USB0.CAM0"}, //Camera Device
Package(){ {"\\_SB.PCI0.SPI1.FPSD"}, //Finger Print Sensor Device
Package(){ {"\\_SB.PCI0.PWM0.ABLS"}, //Ambient Light Sensor
.
.
Package(){ "customizable based on number of devices need to PM managed"}
})

520

Name(S0EM, Package() //S0 Extended system operational mode package
{
Package() {"TENT", "Not Supported"}, //Tent mode Not supported
Package() {"TABLET", "Supported"}, //Tablet mode supported
Package() {"DOCK_LID_OPEN", "Supported"}, //Docking with LID open mode supported
Package() {"DOCK_LID_CLOSED", "Supported"}, //Docking with LID Closed mode supported
})

Fig. 5

POWER MANAGEMENT OF A PROCESSOR AND A PLATFORM IN ACTIVE STATE AND LOW POWER STATE

CROSS REFERENCE TO RELATED APPLICATIONS

The present application claims international priority under 35 U.S.C. § 119 to co-pending Indian Patent Application No. 202141024849, filed Jun. 4, 2021, entitled "POWER MANAGEMENT OF A PROCESSOR AND A PLATFORM IN ACTIVE STATE AND LOW POWER STATE", the entire content and disclosure of which is hereby incorporated by reference in its entirety.

BACKGROUND

In existing designs, system wake logic is always ON and consumes power all the time, irrespective of the system being in an active state (e.g., S0 state as defined by the Advanced Configuration and Power Interface (ACPI) specification) or an idle standby state (e.g., S0ix state as defined by the ACPI specification).

Further, when a system (e.g., notebook, tablet, handheld device) is in a fully operational state (e.g., S0-Fully ON state), Operating System Power Manager (OSPM) opportunistically uses Runtime D3 (RTD3) to transition devices within the system to a lower power mode. RTD3 refers to the placement of a device into D3hot or D3cold state while the rest of the platform or system remains in an S0 state. OSPM opportunistically uses RTD3 by monitoring device idle state. For example, the OSPM waits for the device idleness and if the Latency Tolerance Report (LTR) requirement is met, then the OSPM (or OS) will drive that device into a low power mode, so that it consumes less power and improves the overall battery life. But RTD3 is not applied to all the devices in a system and is completely dependent on an implementation choice of an OEM (Original Equipment Manufacturer), and it is cost additive to the product.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 4 illustrates a pseudo-code that is used to communicate to a software (e.g., operating system) all operational modes supported by the system.

FIG. 5 illustrates a pseudo-code that lists devices which become unusable in certain system operational modes, in accordance with some embodiments.

DETAILED DESCRIPTION

Figure 1:
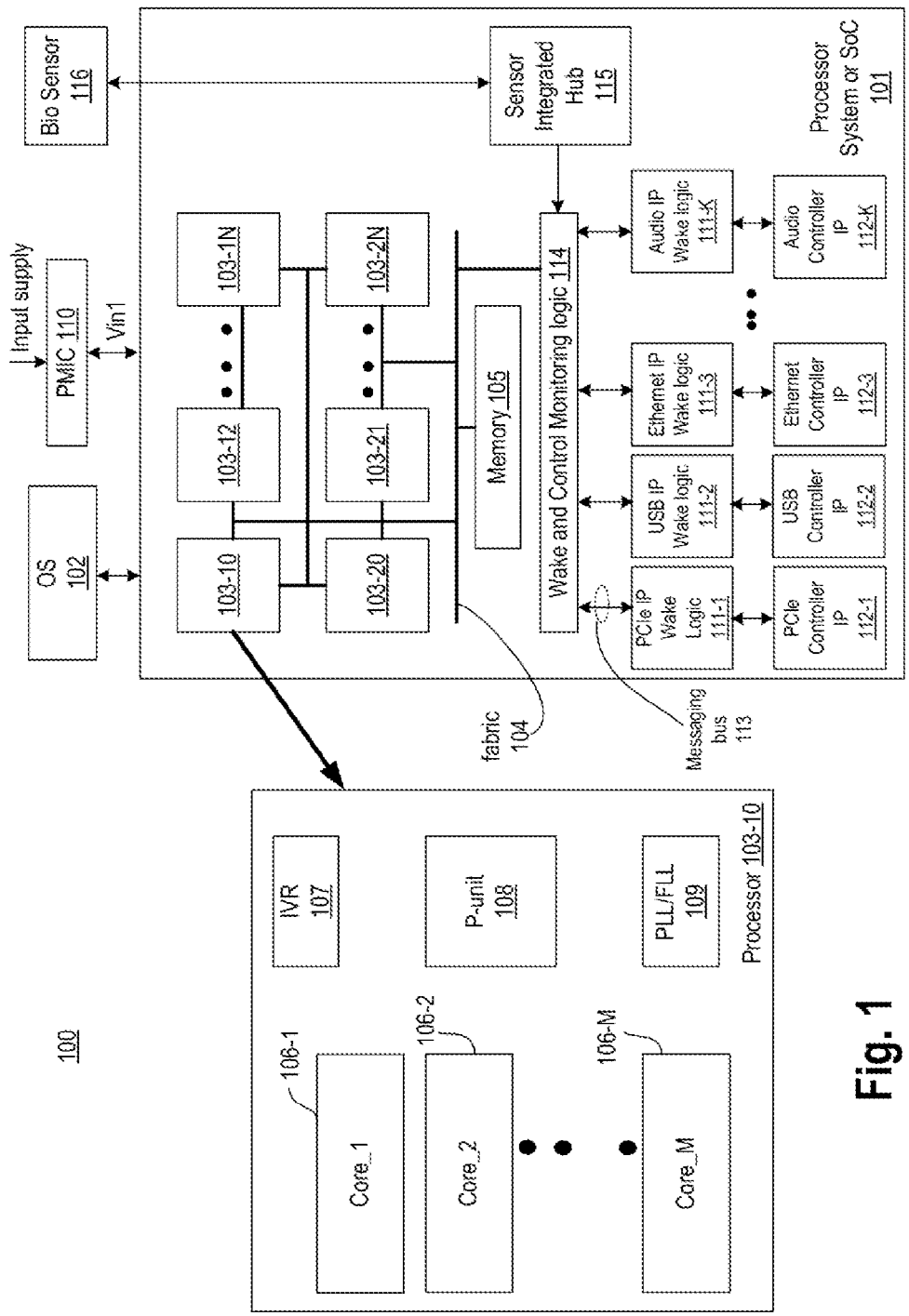
FIG. 1 illustrates a system-on-chip (SoC) architecture for controlling wake logic of individual domains or intellectual property (IP) blocks in S0 state and/or S0ix state, in accordance with some embodiments.

As discussed herein, in existing designs, system wake logic is always powered ON and consumes power all the time, irrespective of the system being in an active (e.g., S0) or low power state (e.g., S0ix state). In the active state case (e.g., S0 case), existing designs do not turn off wake logic or circuits associated with various intellectual property (IP) blocks inside a system-on-chip (SoC). The same is true at a platform or board level where there is no provision for turning off wake circuitry in the active case (e.g., S0 case) where the SoC is in a fully turned on state. In the connected standby or low power case (e.g., S0ix case), once the system enters the low power state, there is no means for the system power management to selectively turn off wake logic associated with platform components.

Some embodiments use one or more sensors (e.g., biological sensors) that can detect presence or absence of a human or a machine controlling a system such as a laptop. In some embodiments, control and monitoring of logic or circuitry is added in an SoC to control turning on/off wake logic or circuits for associated IP blocks inside the SoC. In one such embodiment, the IP blocks (e.g., Universal Serial Bus (USB) controller, audio circuitry, ethernet circuitry, peripheral component interface express (PCIe) circuitry, etc.) are provided with associated wake logic or circuits to control when to wake up or turn off the IP blocks. In some embodiments, when a system is in an active state (e.g., S0 state), control and monitoring logic or circuitry turns off all the wake logic or circuits for the various associated IP blocks. In some embodiments, based on user defined OSPM policies, OSPM kicks off an interrupt to the control and monitoring logic or circuitry to turn off or power gate the wake logic for individual IP blocks in the SoC. As such, wake logic that are idle in active state (e.g., S0 state) and would otherwise draw power in the S0 state are now turned off, thus saving power and/or extending battery life for the system. In some embodiments, when the SoC is in a connected standby state (e.g., S0ix state), then the control and monitoring logic or circuitry selectively turns on the wake logic for the associated IP blocks based on detected user presence for the computing system having the SoC. As such, power is saved and/or battery life is extended in the low power state (e.g., S0ix state).

In some embodiments, a processor is provided which comprises an interconnect fabric and a plurality of processor cores, wherein each processor core of the plurality is coupled to one another via the interconnect fabric. In some embodiments, the processor includes a first wake circuitry to wake up a first circuitry (e.g., Ethernet controller). In some embodiments, the processor includes a second wake circuitry to wake up a second circuitry (e.g., audio controller). In some embodiments, the processor includes a control circuitry coupled to the first wake circuitry and the second wake circuitry, wherein the control circuitry is to turn off the first wake circuitry and the second wake circuitry when a processor core of the plurality of processor cores is in an active operational mode. In some embodiments, the apparatus comprises a sensor hub coupled to the control circuitry, wherein the sensor hub provides an indication to the control circuitry about one or more sensors. In some embodiments, the control circuitry selectively turns on one or both of the first wake circuitry of the second wake circuitry, based on a user presence detected by the sensor hub, when the apparatus is in a low power operational mode. The low power operational mode is an S0ix state as defined by the ACPI specification, or wherein the low power operational mode is a connected standby state. In some embodiments, the control circuitry power gates the first wake circuitry and the second wake circuitry to turn off the first wake circuitry and the second wake circuitry. In some embodiments, an operating system, which is to execute on one or more of processor cores of the plurality of processor cores, issues an interrupt to the control circuitry to power gate the first wake circuitry and the second wake circuitry. The interrupt may be based on a detection of user or an event indicating a change in operating state. In some embodiments, the control circuitry receives an acknowledgment message from the first wake circuitry and the second wake circuitry when the control circuitry turns on the first wake circuitry and the second wake circuitry. In some embodiments, the control circuitry is coupled to the plurality of processor cores via the interconnect fabric. In some embodiments, the active operational mode is an S0 state as defined by the ACPI specification.

A similar power management architecture is provided for the platform or higher-level system, in accordance with some embodiments. In some embodiments, in the fully-on state (e.g., S0 state), while a user is working actively on the system or platform, OSPM initiates turning off of wake logic or circuitry on the board. For example, wake logic or circuitry for GPIO pull-up devices, auxiliary power circuitry, etc. is turned off. In the low power state such as the connected standby or modern connected standby state (e.g., S0ix state), when the system enters such low power state, a system level control and monitoring logic or circuitry is used to selectively turn on wake logic circuitries for various IP blocks based on user presence at the board level. As such, power is saved and/or battery life is extended in the S0ix state. For example, idle power consumption for individual wake logics for IP blocks is reduced. Other technical effects will be evident from the various figures and embodiments.

As discussed in the background section, when a system (e.g., notebook, tablet, handheld device) is in a fully operational state (e.g., S0-Fully ON state), OSPM opportunistically uses RTD3 to transition devices within the system to a lower power mode. However, RTD3 is not applied to all the devices is a system and application RTD3 is completely dependent on an implementation choice of an OEM (Original Equipment Manufacturer), and it is cost additive to the product. An operating system waits for a device idle timeout before transitioning the device to D3 state, thus burning system power for device idle timeout.

To address this issue, some embodiments define a new power management type based on a system operation mode. The system operation mode is a new characteristic that can be standardized in a power management specification such as the ACPI specification. It can also be standardized in any other power management specification. Examples of system operation modes include laptop mode, tent mode, dock mode, tablet mode, etc. Based on the system operation mode, a power manager (e.g., OSPM, firmware, or any suitable software and/or hardware) can perform efficient power management for devices in a system which are unusable in certain system operation modes. For example, when a laptop is docked (i.e., in docked mode), the lid of the laptop is closed and devices like scan matrix keyboard, trackpad, fingerprint sensor, front facing camera, etc. that are physically integrated in the laptop are not accessible physically. As such, these inaccessible components of the laptop in lid mode can be powered down to save power and extend battery life.

In traditional computing systems, system operational mode is not considered for RTD3 which results in unnecessary power loss for specific use cases. For example, if system is in docking mode with system lid closed, then user facing camera becomes unusable. In this scenario as well, if user opens camera application, the user facing camera transitions to D0 state, even though the camera cannot be used when the lid is in closed state. In another case, if the user opens the camera application which brings the user facing camera to D0 state and forgets to close the applications and moves the system back to dock mode with lid closed, the user facing camera is still up and running and continues to consume power.

In some embodiments, based on the system operation mode, a power manager (e.g., OSPM, firmware, or any suitable software and/or hardware) performs efficient power management for devices in a system which are unusable in certain system operation modes. As such, power provided to devices which are otherwise not in use in a practical sense of the term, can be reduced or cut down to zero in accordance with the system operation mode. In some embodiments, a new table is added to the ACPI specification. This table provides entries for different system operational modes (e.g., different S0 operational modes supported by a system). These different system operational modes, that can be defined in the ACPI specification, are sub modes of the S0 state. In some embodiments, system BIOS and/or firmware provides a list of devices, using the new ACPI table, which need to be power managed based on a change in system operation mode. In one such example, system BIOS and/or firmware calls a function call that returns a list of devices which become unusable in certain system operational modes based on a platform design. In some embodiments, based on the system operational mode, the OS (or BIOS and/or firmware) transitions the devices to D3 state without waiting for the device idle timeout and those devices remain in the D3 state irrespective of user activity. The power management scheme of some embodiments compliments existing RTD3 methodology and make it more efficient and effective by saving extra system power at zero or nearly zero additional hardware cost. For example, once in docking mode with lid closed, many devices like system keyboard, touchpad, user facing camera, ambient light sensors, etc. become unusable or physically inaccessible for a user and OS can instantly transition these devices to D3 state without waiting for device idle timeout and these devices can stay in the D3 state irrespective of user interaction. As such, additional power savings are realized in different system operational modes and system idle scenarios.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates a system-on-chip (SoC) architecture 100 (herein also referred to as processor system) for controlling wake logic of individual domains or intellectual property (IP) blocks in the active state (e.g., S0 state) and/or low power state (e.g., S0ix state), in accordance with some embodiments. Processor system 100 comprises processor 101 coupled to operating system (OS) 102. Processor 101 comprises one or more processors 103 (individually labeled as processors 103-10 through 103-1N, and 103-20 through 103-2N, where 'N' is a number), fabric 104 connecting the processor 103, and memory 105. In some embodiments, each processor 103 is a die, dielet, or chiplet. Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor 103 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

In some embodiments, fabric 104 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional units such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, or daisy chain topology. A fabric may be part of a network-on-chip (NoC) with multiple agents. These agents can be any functional unit.

In some embodiments, each of the one or more processors 103 may include a number of processor cores. One such example is illustrated with reference to processor 103-10. In this example, processor 103-10 includes a plurality of processor cores 106-1 through 106-M, where M is a number. For the sake of simplicity, a processor core is referred by the general label 106. Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core. Processor 103-10 may include an integrated voltage regulator (IVR) 107, power control unit (p-unit) 108, phase locked loop (PLL) and/or frequency locked loop (FLL) 109. The various blocks of processor 103-10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, p-unit 108 is coupled to OS 102 via an interface. Here the term "interface" generally refers to software and/or hardware used to communicate with an interconnect. An interface may include logic and I/O driver/receiver to send and receive data over the interconnect or one or more wires.

In some embodiments, each processor 103 is coupled to a power supply via voltage regulator. The voltage regulator may be internal to processor system 101 (e.g., on the package of processor system 101) or external to processor system 101. In some embodiments, each processor 103 includes IVR 107 that receives a primary regulated voltage from the voltage regulator of processor system 101 and generates an operating voltage for the agents of processor 103. The agents of processor 103 are the various components of processor 103 including cores 106, IVR 107, p-unit 108, and PLL/FLL 109.

Accordingly, an implementation of IVR 107 may allow for fine-grained control of voltage and thus power and performance of each individual core 106. As such, each core 106 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 106 may include an IVR to manage power supply to that core where that IVR receives input power supply from the regulated output of IVR 107 or voltage regulator of processor system 101. During power management, a given power domain of one IVR may be powered down or off when the processor core 106 is placed into a certain low power state, while another power domain of another IVR remains active, or fully powered. As such, an IVR may control a certain domain of a logic or processor core 106. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to as an Autonomous Perimeter (AP). A domain can be an entire system-on-chip (SoC) or part of the SoC, and is governed by a p-unit.

In some embodiments, each processor 103 includes its own p-unit 108. P-unit 108 controls the power and/or performance of processor 103. P-unit 108 may control power and/or performance (e.g., IPC, frequency) of each individual core 106. In various embodiments, p-unit 108 of each processor 103 is coupled via fabric 104. As such, the p-units 108 of each processor 103 communicate with another and OS 102 to determine the optimal power state of processor system 101 by controlling power states of individual cores 106 under their domain.

P-unit 108 may include circuitry including hardware, software and/or firmware to perform power management operations with regard to processor 103. In some embodiments, p-unit 108 provides control information to voltage regulator of processor system 101 via an interface to cause the voltage regulator to generate the appropriate regulated voltage. In some embodiments, p-unit 108 provides control information to IVRs of cores 106 via another interface to control the operating voltage generated (or to cause a corresponding IVR to be disabled in a low power mode). In some embodiments, p-unit 108 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 108 is implemented as a microcontroller. The microcontroller can be an embedded microcontroller which is a dedicated controller or as a general-purpose controller. In some embodiments, p-unit 108 is implemented as a control logic configured to execute its own dedicated power management code, here referred to as pCode. In some embodiments, power management operations to be performed by p-unit 108 may be implemented externally to a processor 103, such as by way of a separate power management integrated circuit (PMIC) or other component external to processor system 101. In yet other embodiments, power management operations to be performed by p-unit 108 may be implemented within BIOS or other system software. In some embodiments, p-unit 108 of a processor 103 may assume a role of a supervisor or supervisee.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit In various embodiments, p-unit 108 executes a firmware (referred to as pCode) that communicates with OS 102. In various embodiments, each processor 103 includes a PLL or FLL 109 that generates clock from p-unit 108 and input clock (or reference clock) for each core 106. Cores 106 may include or be associated with independent clock generation circuitry such as one or more PLLs to control operating frequency of each core 106 independently.

In some embodiments, processor system 101 includes a plurality of wake logic (or circuitry) 111-1 through 111-K for the associated IP blocks 112-1 through 112-k. In this example, the plurality of wake logics includes PCIe IP wake logic 111-1, USB IP wake logic 111-2, Ethernet IP wake logic 111-3, and audio IP wake logic 111-K, while the plurality of associated IP blocks include PCIe controller IP 112-1, USB controller IP 112-2, Ethernet controller IP 112-3, and audio controller IP 112-K. These wake logics for associated IP blocks are examples. Other or different wake logics for associated IP blocks can also be added for improved power performance as described herein. In some embodiments, processor system 101 includes wake and control monitoring logic 114 which communicates with the plurality of wake logics (e.g., 111-1 through 111-K) via messaging bus 113. The messaging bus may include signal line(s) to send control message to the wake logic to turn on or off, and may also include signal line(s) to receive an acknowledgement (ACK) message from the wake logic. The acknowledgement message may indicate successful reception of control messages from wake and control monitoring logic 114. In some embodiments, processor system 101 includes sensor integrated hub (SIH) 115 which is used to detect any human activity associated with processor system 101 and provide that indication to wake and control monitoring logic 114. In some embodiments, human activity is detected by one or more biological (bio) sensor(s) 116. Upon detecting such human activity, bio sensor(s) 116 informs SIH 115, which in turn issues an interrupt for wake and control monitoring logic 114.

In some embodiments, wake and control monitoring logic 114 polls data from bio sensor 116 at specific time intervals (or programmable time intervals) and understands whether a user of the computing system has been working on the system for more than a specified time based on OSPM policies. In some embodiments, wake and control monitoring logic 114 uses machine-learning algorithms to understand user behavior of system usage. Wake and control monitoring logic 114 can use predicted user behavior data and/or actual user presence data to control when and which wake logics to turn on/off based on operation mode of the system (e.g., whether the system is in active mode such as S0 or idle mode such as S0ix). A person skilled in the art would appreciate that there are multiple ways to wake a system from sleep or low power state as Connected Standby or Modern Connected Standby. Connected Standby and Modern Connected Standby are power management features specified by Microsoft Corporation. In one example, a wireless signal or a remote signal may be used to wake up a system without using bio sensor 116. Such wake up indications are also monitored by wake and control monitoring logic 114, in accordance with some embodiments.

In some embodiments, wake and control monitoring logic 114 manages power when processor system 101 is fully on (e.g., in S0 state). In one such active state, the plurality of wake logics 111-1 through 111-K may not need to remain on or function as they would draw power when not in use. Wake and control monitoring logic 114 turns off these plurality of wake logics 111-1 through 111-K during the active state (e.g., S0 state).

System logic may be categorized in two buckets-category I and category II. Category I includes those wake mechanisms, which require a user to be mandatorily present around the system e.g., power button press, key board press, touchpad, etc. Category II includes those wake mechanisms, which does not mandate user presence around the system e.g., wake on magic packet, wake on voice etc.

In some embodiments, when processor system 101 enters a low power state such as S0ix state, the OSPM (e.g., part of OS 102) activates category-II wake logics of IP blocks in SoC or processor system 101. In some embodiments, the OSPM activate the category-II wake logics via wake and control monitoring logic 114. In some embodiments, when processor system 101 enters a low power state such as S0ix state, the OSPM activates category-II wake logics of IP blocks of a platform or board. After activating the category-II wake logics of IP blocks in SoC or processor system 101 and/or the category-II wake logics of IP blocks of a platform or board, the OSPM activates bio sensor 116 when processor system 101 enters a low power state such as S0ix state. In various embodiments, when processor system 101 enters a low power state such as S0ix state bio sensor 116 keeps on polling for human presence to selectively turn on or off category-I wake logic blocks. For example, when bio sensor 116 detects human presence, OSPM (via wake and control monitoring logic 114) turns on category-I wake logics for associated IP blocks in processor system 101 and at the board or platform level. In some embodiments, when bio sensor 116 does not detect human presence, OSPM (via wake and control monitoring logic 114) turns off category-I wake logics for associated IP blocks in processor system 101 and at the board or platform level.

In some embodiments, when processor system 101 enters an active state (e.g., S0 state), the OSPM (e.g., via wake and control monitoring logic 114) turns off both category-I and category-II wake logic blocks associated with IP blocks in processor system 101. In some embodiments, when processor system 101 enters the active state, the OSPM (e.g., via wake and control monitoring logic 114) turns off both category-I and category-II wake logic blocks associated with IP blocks in the platform or board. In some embodiments, when processor system 101 enters the active state, the OSPM (e.g., via wake and control monitoring logic 114) turns off bio sensor 116. As such, processor system and/or board save power in both active states (e.g., S0 state) and low power state (e.g., S0ix state).

Figure 2:
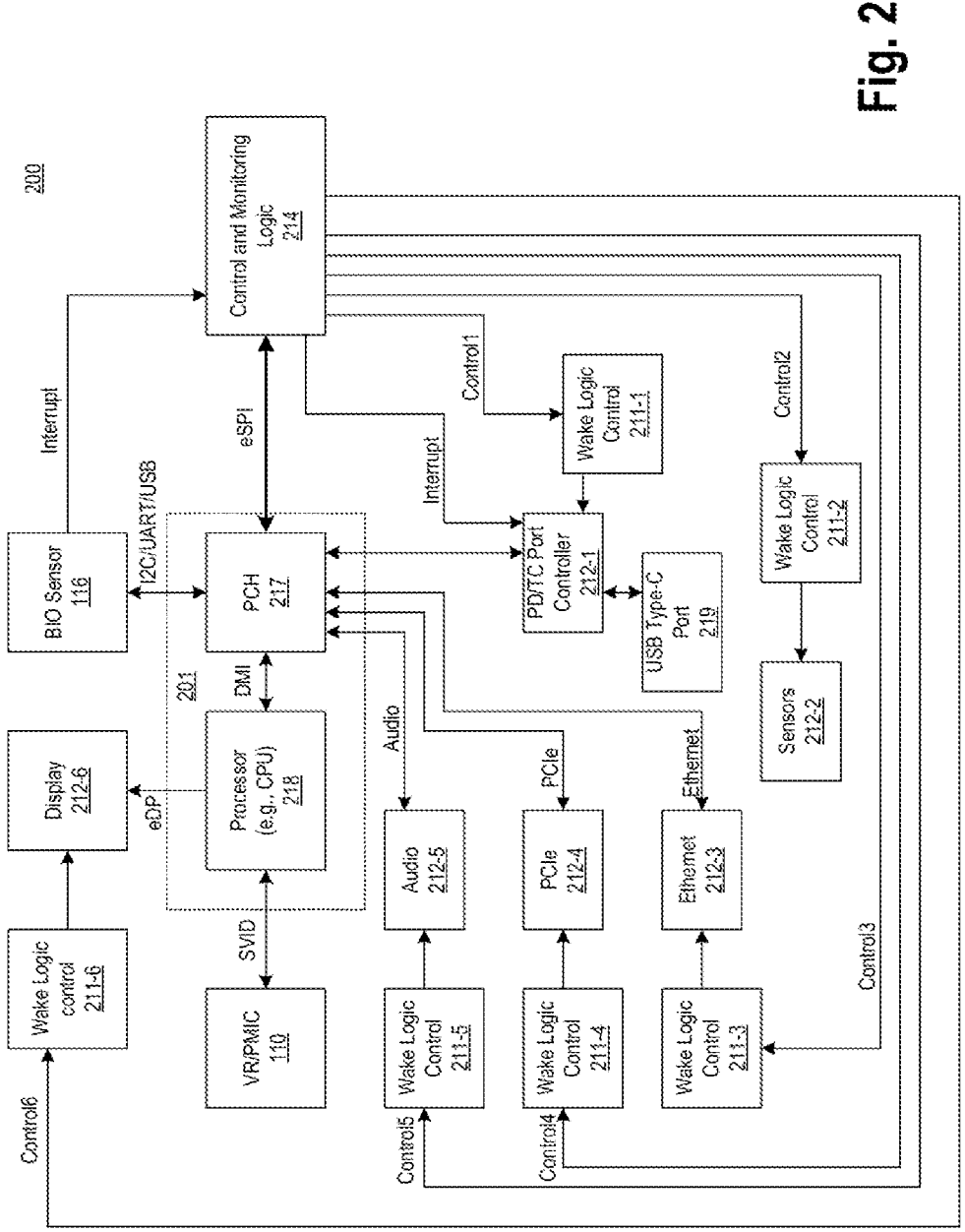
FIG. 2 illustrates a system or platform architecture for controlling wake logic of various components of the system or platform, in accordance with some embodiments.

FIG. 2 illustrates system or platform architecture 200 for controlling wake logic of various components of the system or platform (or board), in accordance with some embodiments. Architecture 200 comprises processor system 201 (e.g., processor system 101), a plurality of wake logics (e.g., 211-1 through 211-6), a plurality of associated IP blocks (e.g., 212-1 through 211-6), voltage regulator (VR) or PMIC 110, and control and monitoring logic 214. The wake logic architecture of platform architecture 200 is similar to the wake logic architecture processor system 101, but at a board or platform-level. In various embodiments, processor system 201 comprises processor 218 (e.g., having a plurality of processor cores and various blocks of processor system 101) and platform controller hub (PCH) 217. PCH 217 may be coupled to processor 218 by any suitable interface such as a desktop management interface (DMI). Processor 218 receives power supply from VR 110 based on a voltage identification (SVID). Control and monitoring logic 214 may communicate with PCH using any suitable interface (e.g., Enhanced Serial Peripheral Interface (eSPI)). In some embodiments, IP block associated with wake logic control 211-1 is power delivery (PD) controller 212-1. In some embodiments, IP block associated with wake logic control 211-2 is one or more sensors 212-2. In some embodiments, IP block associated with wake logic control 211-3 is Ethernet controller 212-3. In some embodiments, IP block associated with wake logic control 211-4 is PCIe controller 212-4. In some embodiments, IP block associated with wake logic control 211-5 is Audio controller 212-5. In some embodiments, IP block associated with wake logic control 211-6 is Ethernet display 212-6 or display controller. In some embodiments, processor 218 communicates with display 212-6 via embedded display port (eDP).

In some embodiments, when processor system 201 enters the active state (e.g., S0 state), the OSPM (e.g., via wake and control monitoring logic 214) turns off both category-I and category-II wake logic blocks (e.g., collectively referred to as 211) associated with IP blocks (collectively referred to as 212) in the platform or board. In some embodiments, when processor system 201 enters the active state, the OSPM (e.g., via wake and control monitoring logic 114) turns off bio sensor 116. As such, processor system and/or board save power in both active states (e.g., S0 state) and low power states (e.g., S0ix state).

In some embodiments, when processor system 201 enters a low power state such as S0ix state, the OSPM (e.g., part of OS 102) activates category-II wake logics of IP blocks in SoC or processor system 201. In some embodiments, when system 200 enters a low power state such as S0ix state, the OSPM activates category-II wake logics (collectively referred to as 211) of IP blocks (collectively referred to as 212) of a platform or board. After activating the category-II wake logics of IP blocks in SoC or processor system 201 and/or the category-II wake logics of IP blocks of a platform or board 200, the OSPM activates bio sensor 116 when processor system 201 enters a low power state such as S0ix state. In various embodiments, when processor system 201 enters a low power state such as S0ix state bio sensor 116 keeps on polling for human presence to selectively turn on or off category-I wake logic blocks. For example, when bio sensor 116 detects human presence, OSPM turns on category-I wake logics for associated IP blocks at the board or platform level via control and monitoring logic 214. In some embodiments, when bio sensor 116 does not detect human presence, OSPM (via wake and control monitoring logic 214) turns off category-I wake logics 211 for associated IP blocks 212 at the board or platform level. While low power state is described with reference to S0ix state, the power management scheme is applicable to other low power states such as S3, S4, S5, etc. In various embodiments, the wake logics include GPIOs that are used for waking the system from specific sleep states.

As such, when the system is fully on (e.g., user is working actively on the system), OSPM via control and monitoring logic 214 can go ahead and start initiating turning off wake circuitry 211 present on board 200 e.g. GPIO pull-ups, aux power circuitry etc., in accordance to various embodiments. When system 200 enters a low power state (such as S0ix, connected standby, modern connected standby etc.), control and monitoring logic 214 causes wake logic 211 to be turned on selectively, based on user presence at board level e.g. GPIO pull-ups, aux power circuitry etc.

Figure 3:
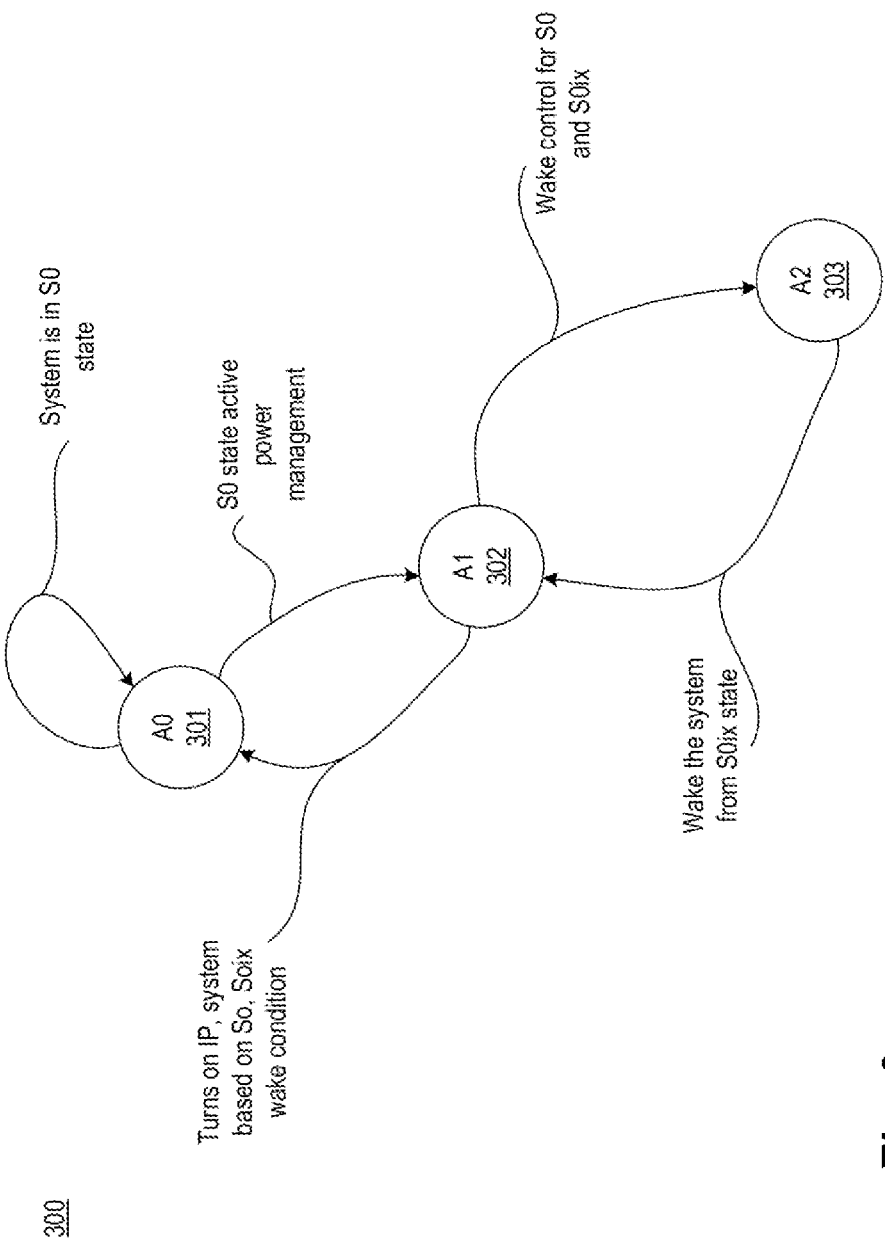
FIG. 3 illustrates a state transition diagram for wake logic control in S0, S0ix states at an SoC level and a platform level, respectively, in accordance with some embodiments.

FIG. 3 illustrates a state transition diagram 300 for wake logic control in S0, S0ix states at an SoC level and a platform level, respectively, in accordance with some embodiments. The various states and operations indicated by the arrows can be implemented by hardware, software, or a combination of them. Here, three states are shown—A0 state 301 which is a fully active state (e.g., S0 state), A1 state 302 which is an active power management state or idle state (e.g., where the display may be in ON state), and A2 state 303 which is a deep sleep state (e.g., when display is off).

In the fully on state A0 301, control and monitoring logic 114 turns off wake logic 111 inside processor 201, and control and monitoring logic 214 turns off wake logic 211 at the board level (e.g., system 200). When the system enters state A1, for example, because system detects lack of presence of the user or enters a lower power state (e.g., S0ix), the OSPM (e.g., part of OS 102) activates category-II wake logics of IP blocks 111 in SoC or processor system 101. In some embodiments, the OSPM activates the category-II wake logics 111 via wake and control monitoring logic 114. In some embodiments, when processor system 101 enters a low power state such as S0ix state, the OSPM activates category-II wake logics 211 of IP blocks 212 of platform or board 200. After activating the category-II wake logics 111 of IP blocks 112 in SoC or processor system 101 and/or the category-II wake logics 211 of IP blocks 212 of platform or board 200, the OSPM activates bio sensor 116 when processor system 201 enters a low power state such as S0ix state. In various embodiments, when processor system 101/201 enters a low power state such as S0ix state bio sensor 116 keeps on polling for human presence to selectively turn on or off category-I wake logic blocks. For example, when bio sensor 116 detects human presence, OSPM (via wake and control monitoring logics 114 and 214) turns on category-I wake logics for associated IP blocks in processor system 101 and at the board or platform 200. In some embodiments, when bio sensor 116 does not detect human presence, OSPM (via wake and control monitoring logic 114 and 214) turns off category-I wake logics for associated IP blocks in processor system 101 and at the board or platform level.

When the system is in A2 state and receives a wake event, OSPM via wake and control monitoring logic 114 and 214 wakes up the IP blocks since the wake-up logics were kept off during low power state. The system then progresses towards A0 state, in which OSPM via wake and control monitoring logic 114 and 214 turns off the wake logic 111 and 211.

Elements of embodiments (e.g., flowchart with reference to FIG. 3) are also provided as a machine-readable medium for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, system 200 comprises processor 201 which is a Digital Signal Processor (DSP), an Application Specific Integrated Circuit (ASIC), a general-purpose Central Processing Unit (CPU), or a low power logic implementing a simple finite state machine to perform the method with reference to FIG. 3 and/or various embodiments, etc.

In some embodiments, the various logic blocks of system 200 are coupled together via a Network Bus. Any suitable protocol may be used to implement the network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with flowcharts with reference to FIG. 3 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts with reference to FIG. 3 (and/or various embodiments) are executed by system.

In some embodiments, the program software code/instructions associated with reference to FIG. 3 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to FIG. 3 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), ferroelectric memory, resistive RAM, phase change memory (PCM), magnetic RAM (MRAM, among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine-readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments, the machine-readable storage media includes machine-readable instructions stored thereon, that when executed, cause one or more machines to perform a method comprising controlling a power gate, coupled to a first power supply rail and a second power supply rail, according to a control signal, wherein the second power supply rail is coupled to a computing platform. In some embodiments, the method further comprises generating the control signal according to a match between a first biometric data stored in memory and second biometric data sensed by a biometric sensor. In some embodiments, the method further comprises turning off the power gate to cut off a second power on the second power supply rail when the first biometric data does not match with the second biometric data. In some embodiments, the method comprises turning on the power gate to provide the first power as a second power on the second power supply rail when the first biometric data substantially matches with the second biometric data. In some embodiments, the method comprises issuing an interrupt when the biometric sensor generates the second biometric data.

In traditional computing systems, system operational mode is not considered for RTD3 which results in unnecessary power loss for specific use cases. For example, if system is in docking mode with system lid closed, then user facing camera becomes unusable. In this scenario as well, if user opens camera application, the user facing camera transitions to DO state, even though the camera cannot be used in when the lid is closed state. In another case, if the user opens the camera application which brings the user facing camera to DO state and forgets to close the applications and moves the system back to dock mode with lid closed, the user facing camera is still up and running and continues to consume power.

FIG. 4 illustrates pseudocodes 400 and 420 that are used to communicate to a software (e.g., operating system) all operational modes supported by the system. Some embodiments define a new power management type based on a system operation mode. The system operation mode is a new characteristic that can be standardized in a power management specification such as the ACPI specification. Examples of system operation modes include laptop mode, tent mode, dock mode, tablet mode, etc. Based on the system operation mode, a power manager (e.g., OSPM, firmware, or any suitable software and/or hardware) can perform efficient power management for devices in a system which are unusable in certain system operation modes. For example, when a laptop is docked (i.e., in docked mode), the lid of the laptop is closed and devices like scan matrix keyboard, trackpad, fingerprint sensor, front facing camera, etc. that are physically integrated in the laptop are not accessible physically. As such, these inaccessible components of the laptop in lid mode can be powered down to save power and extend battery life.

Table 1 illustrates a sample table for the ACPI specification to list devices that are managed by system operation modes.

TABLE 1

| Device Type | Supported for system operation mode (yes or no) |
| --- | --- |
| Lid device | yes |
| Scan matrix keyboard | yes |
| Track pad device | yes |
| Camera device | yes |
| Fingerprint sensor device | yes |
| Ambient light sensor | yes |

Table 2 illustrates a list of possible actions taken based on system operation mode and the supported devices in Table 1.

TABLE 2

| System Operation Mode | Description of Action | Device | Power State |
| --- | --- | --- | --- |
| Docking with Lid closed mode | If closed, put keyboard matrix, touchpad, user facing camera, fingerprint sensor in low power mode; | Scan matrix keyboard Track pad device Camera Device Fingerprint sensor device Ambient light sensor | Low Low Low Low Low |
| Docking with Lid open mode | If open, keep devices such as keyboard matrix, touchpad, user facing camera, fingerprint sensor in normal power mode | Scan matrix keyboard Track pad device Camera Device Fingerprint sensor device Ambient light sensor | Normal Normal Normal Normal Normal |

TABLE 2-continued

| System Operation Mode | Description of Action | Device | Power State |
|---|---|---|---|
| | If user is using the laptop or device to just watch (e.g., passive activity) and not using the keyboard, trackpad then put Scan matrix keyboard, trackpad, fingerprint sensor, camera device in low power mode | Scan matrix keyboard Track pad device Camera Device Fingerprint sensor device Ambient light sensor | Low Low Low Low Low |
| Video conferencing mode | Keep user facing camera on, put fingerprint sensor in low power mode, put ambient light sensor in low power mode, put scan keyboard matrix in low power mode, | Scan matrix keyboard Track pad device Camera Device Fingerprint sensor device Ambient light sensor | Low Normal Normal Low Low |
| Tab mode | Keep devices such as keyboard matrix, touchpad, fingerprint sensor in low power mode. Camera and Ambient sensor in normal mode. | Scan matrix keyboard Track pad device Camera Device Fingerprint sensor device Ambient light sensor | Low Low Normal Low Normal |
| Tent mode | Keep all devices in normal mode. | Scan matrix keyboard Track pad device Camera Device Fingerprint sensor device Ambient light sensor | Normal Normal Normal Normal Normal |
| ... | ... | ... | ... |

Table 1 and Table 2 provide examples. A user or OEM can customize the tables for each product prior to using or shipping. In various embodiments, method or function pseudocode are provided that can provide the user or OEM a list of devices supported for power management on the basis of system operation mode. Pseudocode 400 defines a method or function "_PMD" (Power Mode Disable Device Lists) that when invoked returns a list of supported devices (e.g., as depicted in Table 1) for power management. For example, _PMD method can be defined in the ACPI specification and when invoked returns the package of device lists of what all devices that will become unusable in respective operational mode.

Pseudocode 420 is an example of a list of operational modes. System BIOS is specific to a system and as such has all the information of system components and system design. Based on the system design or architecture BIOS uses the proposed ACPI method _S0E (S0 Extended Mode) to exactly communicate what all operational modes are supported in the system which defines system operational mode i.e., current S0 system mode. Examples of system operation modes are: Tent Mode, Tab mode, Docking with Lid closed mode, Docking with Lid open mode, etc.

FIG. 5 illustrates pseudocode 500 and 520 that list devices which become unusable in certain system operational modes, in accordance with some embodiments. As shown in pseudocode 400 _PMD method returns _DEVL (e.g., device list). This device list is provided in pseudocode 500. In this example, "SB" is system bus, "PCI0" is root bridge, "LPCB" is low pin count bridge, "EC" is embedded controller, "LID0" is lid controller. The path "\\_SB.PCI0.LPCB.H_EC.LID0" provides the path to the lid controller which has access to controlling other devices associated with the lid. Other examples in pseudocode 500 are paths to controllers for scan matrix keyboard, track pad device, track ball device, camera device, fingerprint sensor device, and ambient light sensor. This list of devices can be any list according to the OEM or user (if user is given access to the method). Pseudocode 520 provides an example of list of operational modes such as Tent Mode, Tab mode, Docking with Lid closed mode, Docking with Lid open mode, etc. When method _S0E is called (as shown by pseudocode 420), SOEM is invoked which provides a list of supported and unsupported operational modes. This list is modifiable by the OEM or a user having access to this file.

Figure 6:
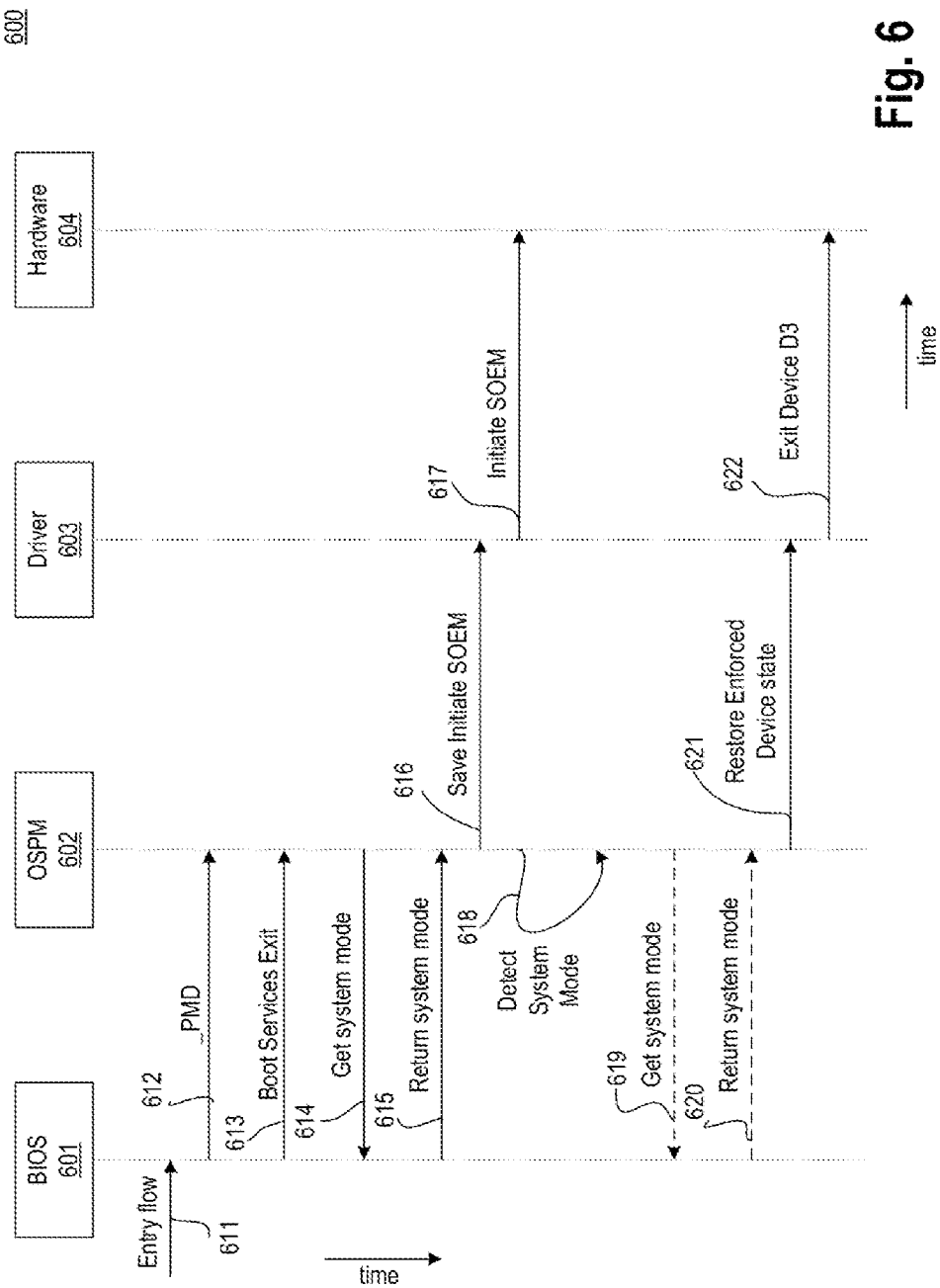
FIG. 6 illustrates a flowchart showing software to hardware interaction for power management using system operational mode, in accordance with some embodiments.

FIG. 6 illustrates flowchart 600 showing software to hardware interaction for power management using system operational mode, in accordance with some embodiments. Flowchart shows various actions made by different software or firmware components including BIOS 601, OSPM 602, and Driver 603. The various actions are executed by hardware 604, which implements the power management on the basis of system operation mode. In some embodiments, BIOS 601 receives an indication that it supports power management using system operation mode, and enters the power management flow as indicated by arrow 611. Upon entering the power management flow, BIOS invokes the _PMD call to OSPM 602 as indicated by arrow 612. This call fetches the list of devices supported by system operation mode-based power management.

BIOS 601 after some time informs OSPM 602 that boot services are complete and exits the boot services as indicated by arrow 613. OSPM 602 then asks BIOS 601 regarding the supported system operation modes as indicated by arrow 614. BIOS 601 then provides the list of system operation modes supported by the system (e.g., laptop) as indicated by arrow 615. In some embodiments, when system is booting, BIOS 601 provides specific system mode configuration through _SOE method and the required device list which is power managed through _PMD to OSPM 602 and OSPM 602 queries the same. This process is indicated by arrows 612, 613, 614, 615, 616, and 617, where OSPM gets the current system operation mode and list of devices that can enter low power state (e.g., D3 state) for that system operation mode. At this point, OSPM 602 is aware of all supported devices for various system operation modes, and instructs hardware 604 via driver 603 about what devices to put in RTD3 state based on the system operation mode. Based on the various system operational mode change, OSPM 602 will begin initiating D3 power management state to the list of devices which it queried through _PMD and based on that Device driver 603, OSPM 602 will initiate ACPI D3 state for specific Device hardware. While various embodiments here are described with reference to D3 being the low power state, the embodiments can be modified to use the system operation mode to move listed devices into any low power state.

In various embodiments, based on the user usage, OSPM detects the current system operation mode as indicated by arrow 618. If the operation mode changed, (e.g., the lid is opened). OSPM 602 asks BIOS 601 to provide list of devices associated with the operation mode (lid opened), and receives that information. This is indicated by arrows 619 and 620. OSPM 602 then asks Driver 603 to restore the power state of the devices associated with the system operation mode (lid opened) as indicated by arrow 621. Driver 603 then instructs hardware 604 to exit the D3 or RTD3 state for the device(s) for that system operation mode (lid opened) as indicated by arrow 622.

Figure 7:
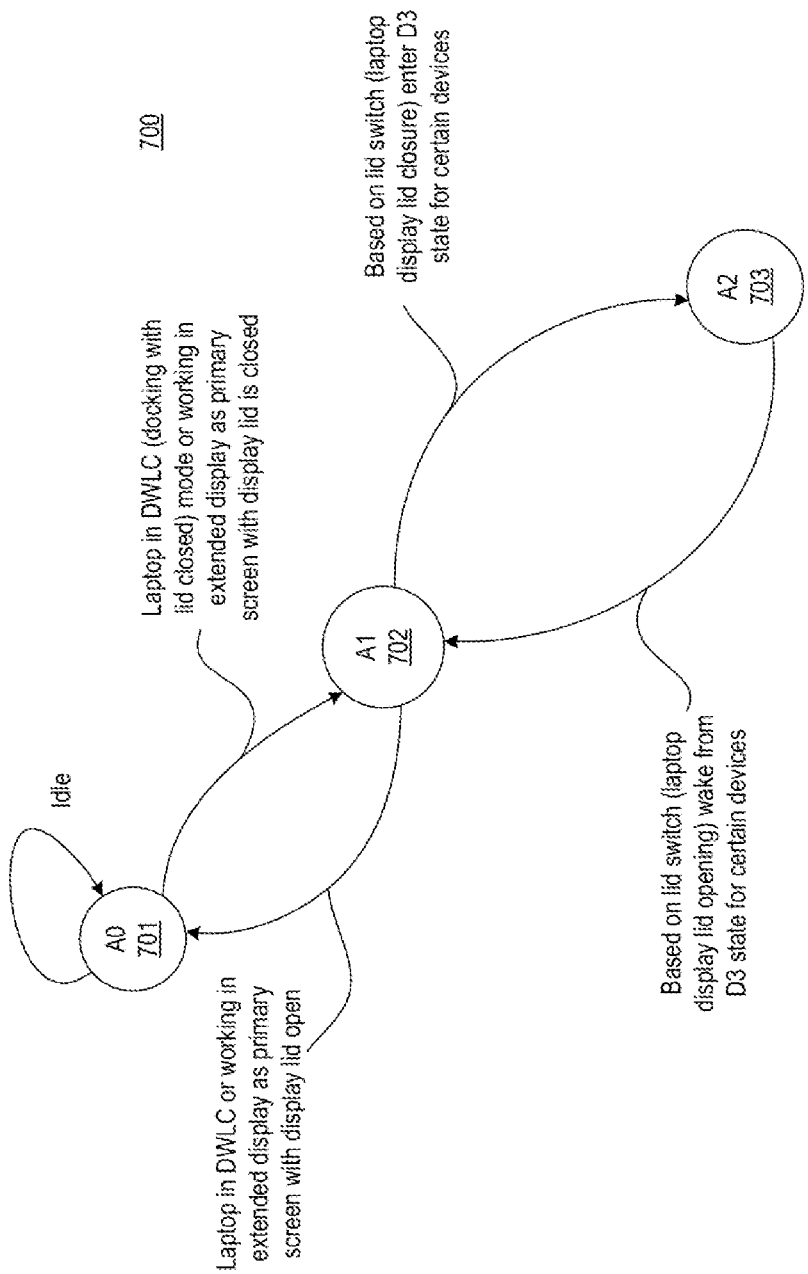
FIG. 7 illustrates a state transition diagram for power management using system operational mode, in accordance with some embodiments.

FIG. 7 illustrates state transition diagram 700 for power management using system operational mode, in accordance with some embodiments. State A0 701 is the normal active state, A1 702 is the state where system operation mode changes, and A2 703 is the low power state (e.g., D3 state) for the devices associated with the particular system operation mode. The state diagram 700 can be executed by software, hardware, or a combination of them.

In this example, assume system is in DWLC operational mode (Docking With Lid Closed mode). Once the system is in docking mode and the lid is closed then the system keyboard, fingerprint sensor, touchpad, trackball, ambient light sensor become unusable and physically inaccessible to the user. In some embodiments, BIOS 601 makes use of the proposed ACPI specification addition to inform OSPM 602 about what all devices will become unusable once in the DWLC mode. Once the system is put into the DWLC mode, OSPM 602 gets a notification (e.g. from embedded controller and/or sensors in present system designs). In some embodiments, OSPM 602 makes use of the BIOS table information (e.g., Tables 1 and 2) and directs respective system drivers 603 to instantly transition the devices to D3 (or any suitable low power state). Once in the DWLC state, the state diagram moves from A0 state 701 to A1 state 702. Based on lid switch (e.g., that provides laptop display lid closure indication), driver 603 initiates D3 state for the touchpad, trackball, fingerprint sensor, and the ambient light sensor. Driver 603 may also instruct the controller scanning scan matrix keyboard to stop scanning keys, and gates power supply for the scan matrix keyboard.

In some embodiments, OSPM 602 continues to keep these devices in D3 state irrespective of user interactions till the DWLC operation mode persists (e.g., in A2 state 703). Other system devices which are not impacted by the DWLC operational mode (e.g. USB, Storage etc.) can follow traditional RTD3 approach i.e., OSPM 602 instructs the device drivers 603 for D3 to D0 transition based on device idle time. When DWLC operation mode ends (e.g., lid is opened as indicated by the lid switch), driver 603 initiates the wake process. For example, driver 603 initiates D3 Wake process for the touchpad, trackball, fingerprint sensor, and ambient light sensor. In various embodiments, driver 603 instructs controller scanning scan matrix keyboard to start scanning keys and ungates power supply for the scan matrix keyboard. The laptop then resumes to normal usage as indicated by state 701.

Elements of embodiments (e.g., flowchart with reference to FIGS. 6-7) are also provided as a machine-readable medium for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, a machine-readable storage media is provided having machine-executable instructions that when executed cause one or more machines (e.g., one or more processor cores) to perform a method comprising reading a list of system operation modes of a computing system. In some embodiments, the method further comprises reading a list of devices of the computing system that correspond to the system operation modes, wherein the list of devices can opportunistically enter a low power state based on the system operation modes. In some embodiments, the method further comprises determining a current system operation mode which is among the list of system operation modes. In some embodiments, the method comprises determining a current list of devices corresponding to the current system operation mode, wherein the current list of devices is among the list of devices. In some embodiments, the method comprises instructing a driver or hardware to enter the low power state for the current list of devices based on the current system operation mode.

In some embodiments, the method further comprises determining a change in the current system operation mode; and instructing a driver or hardware to exit the low power state based on the change in the current system operation mode. In some embodiments, the list of system operation modes is defined in a power management specification. In some embodiments, the list of devices is defined in the power management specification. In some embodiments, the list of system operation modes and the list of devices are modifiable. In some embodiments, the low power state is a runtime D3 (RTD3) state. In some embodiments, the hardware includes one or more controllers.

Figure 8:
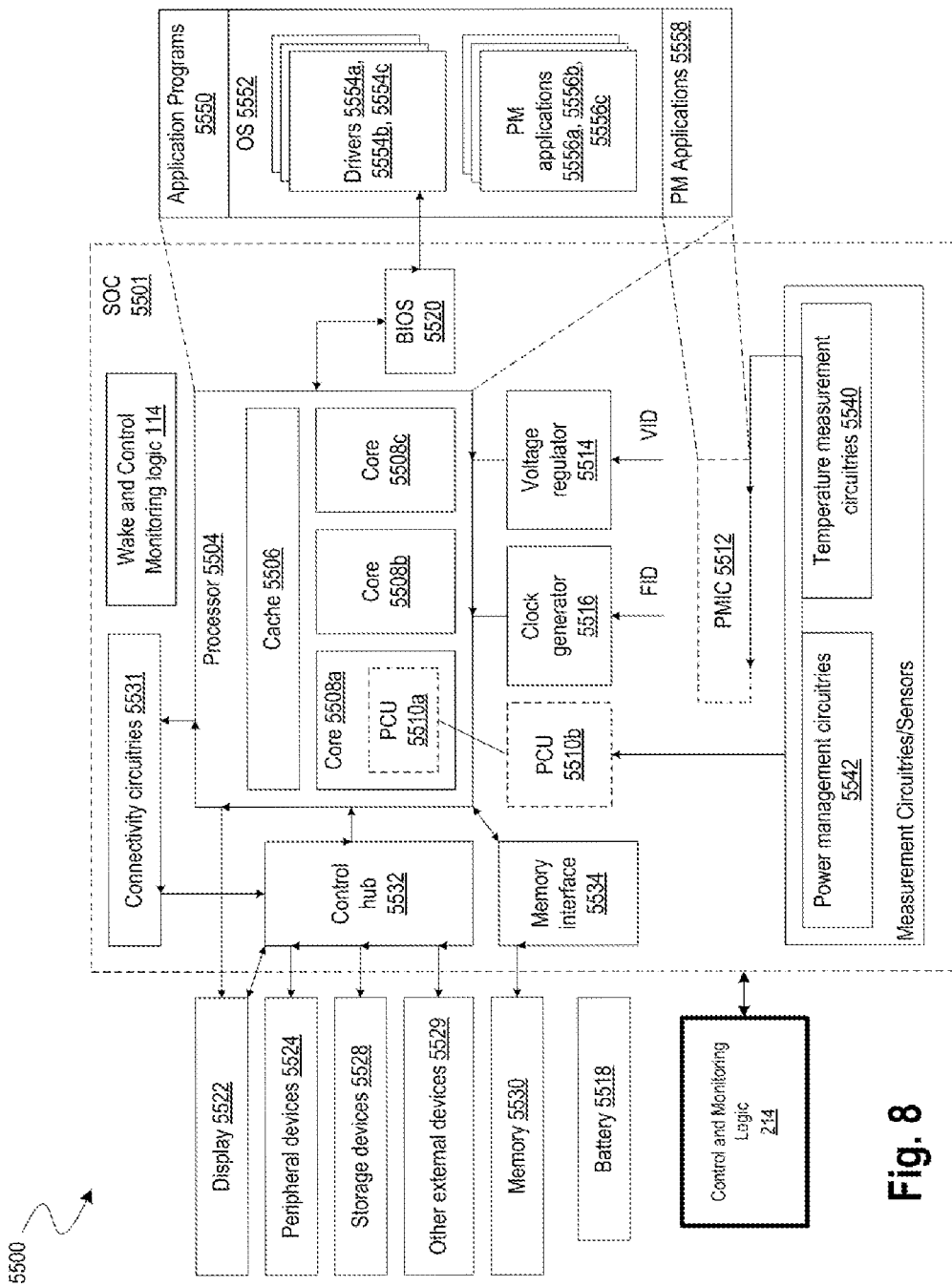
FIG. 8 illustrates a smart device or a computer system or an SoC (System-on-Chip) with wakeup logic and associated control to manage power, and/or software or firmware for power management using system operational mode, in accordance with some embodiments.

FIG. 8 illustrates a smart device or a computer system or an SoC (System-on-Chip) with wakeup logic and associated control to manage power, and/or software or firmware for power management using system operational mode, in accordance with some embodiments. It is pointed out that those elements of FIG. 8 having the same reference numbers (or names) as the elements of any other figure may operate or function in any manner similar to that described, but are not limited to such.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 8, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 8, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax or 5G/LTE equivalent), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508*a*, 5508*b*, 5508*c*, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operation modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510*a/b* and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510b.

In some embodiments, pCode executing on PCU 5510a/b has a capability to enable extra compute and telemetries resources for the runtime support of the pCode. Here pCode refers to a firmware executed by PCU 5510a/b to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance. Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: an interconnect fabric; a plurality of processor cores, wherein each processor core of the plurality of processor cores is coupled to one another via the interconnect fabric; a first wake circuitry to wake up a first circuitry; a second wake circuitry to wake up a second circuitry; and a control circuitry coupled to the first wake circuitry and the second wake circuitry, wherein the control circuitry is to turn off the first wake circuitry and the second wake circuitry when a processor core of the plurality of processor cores is in an active operational mode.

Example 2: The apparatus of example 1 comprises a sensor hub coupled to the control circuitry, wherein the sensor hub is to provide an indication to the control circuitry about one or more sensors.

Example 3: The apparatus of example 2, wherein the control circuitry is to selectively turn on one or both of the first wake circuitry of the second wake circuitry, based on a user presence detected by the sensor hub, when the apparatus is in a low power operational mode.

Example 4: The apparatus of example 3, wherein the low power operational mode is an S0ix state as defined by ACPI specification, or wherein the low power operational mode is a connected standby state.

Example 5: The apparatus of example 1, wherein the control circuitry is to power gate the first wake circuitry and the second wake circuitry to turn off the first wake circuitry and the second wake circuitry.

Example 6: The apparatus of example 1, wherein an operating system, which is to execute on one or more of processor cores of the plurality of processor cores, is to issue an interrupt to the control circuitry to power gate the first wake circuitry and the second wake circuitry.

Example 7: The apparatus of example 1, wherein the control circuitry is to receive an acknowledgment message from the first wake circuitry and the second wake circuitry when the control circuitry turns on the first wake circuitry and the second wake circuitry.

Example 8: The apparatus of example 1, wherein the control circuitry is coupled to the plurality of processor cores via the interconnect fabric.

Example 9: The apparatus of example 1, wherein the active operational mode is an S0 state as defined by ACPI specification.

Example 10: An apparatus comprising: a plurality of wake circuitries; a plurality of intellectual property (IP) blocks, wherein each IP block corresponds to a wake circuitry of the plurality of wake circuitries; and a control circuitry coupled to the plurality of wake circuitries, wherein the control circuitry is to turn off the plurality of wake circuitries when the apparatus is in an active operational mode.

Example 11: The apparatus of example 10 comprises a sensor hub coupled to the control circuitry, wherein the sensor hub is to provide an indication to the control circuitry about one or more sensors.

Example 12: The apparatus of example 11, wherein the control circuitry is to selectively turn on one or more of wake circuitries of the plurality of wake circuitries, based on a user presence detected by the sensor hub, when the apparatus is in a low power operational mode.

Example 13: The apparatus of example 12, wherein the low power operational mode is an S0ix state as defined by ACPI specification, or wherein the low power operational mode is a connected standby state.

Example 14: The apparatus of example 10, wherein the control circuitry is to power gate the plurality of wake circuitries to turn off the plurality of wake circuitries.

Example 15: The apparatus of example 10, wherein the control circuitry is to power gate the plurality of wake circuitries in response to an interrupt from an operating system.

Example 16: A system comprising: a memory; a processor coupled to the memory, wherein the processor includes a plurality of processor cores; a display communicatively coupled to the processor; a sensor; a plurality of first wake circuitries; a plurality of first intellectual property (IP) blocks, wherein each first IP block corresponds to a first wake circuitry of the plurality of first wake circuitries; and a first control circuitry coupled to the plurality of first wake circuitries and the sensor, wherein the first control circuitry is to turn off the plurality of first wake circuitries when the system is in an active operational mode.

Example 17: The system of example 16, wherein the processor includes: a plurality of second wake circuitries; a plurality of second IP blocks, wherein each second IP block corresponds to a wake circuitry of the plurality of second wake circuitries; and a second control circuitry coupled to the plurality of second wake circuitries, wherein the second control circuitry is to turn off the plurality of second wake circuitries when any processor core of the plurality of processor cores is in an active operational mode.

Example 18: The system of example 17, wherein the first control circuitry turns on the sensor and the plurality of first wake circuitries when the system is a low power operational mode.

Example 19: The system of example 17, wherein the first control circuitry is to selectively turn on the plurality of first wake circuitries based on a detection by the sensor that a user is present, and wherein the second control circuitry is to selectively turn on the plurality of second wake circuitries based on the detection by the sensor that the user is present.

Example 20: The system of example 16, wherein the sensor continuously polls for user presence to cause the first control circuitry to selectively turn on or off the plurality of first wake circuitries.

Example 21: A machine-readable storage media having machine-executable instructions that when executed cause one or more machines to perform a method comprising: reading a list of system operation modes of a computing system; reading a list of devices of the computing system that correspond to the system operation modes, wherein the list of devices can opportunistically enter a low power state based on the system operation modes; determining a current system operation mode which is among the list of system operation modes; determining a current list of devices corresponding to the current system operation mode, wherein the current list of devices is among the list of devices; and instructing a driver or hardware to enter the low power state for the current list of devices based on the current system operation mode.

Example 22: The machine-readable storage media of example 21 having further machine-executable instructions that when executed cause the one or more machines to perform a further method comprising: determining a change in the current system operation mode; and instructing a driver or hardware to exit the low power state based on the change in the current system operation mode.

Example 23: The machine-readable storage media of example 21, wherein the list of system operation modes is defined in a power management specification.

Example 24: The machine-readable storage media of example 23, wherein the list of devices is defined in the power management specification.

Example 25: The machine-readable storage media of example 21, wherein the list of system operation modes and the list of devices are modifiable.

Example 26: The machine-readable storage media of example 21, wherein the low power state is a runtime D3 (RTD3) state.

Example 27: The machine-readable storage media of example 21, wherein the hardware includes one or more controllers.

Example 28: An apparatus comprising: a processor circuitry to execute one or more instructions; and a plurality of device components communicatively coupled to the processor circuitry directly or via one or more controllers, wherein the processor circuitry is to: read a list of system operation modes of the apparatus; read a list of devices from among the plurality of device components, wherein the list of devices corresponds to the list of system operation modes, wherein the list of devices can opportunistically enter a low power state based on the list of system operation modes; determine a current system operation mode which is among the list of system operation modes; determine a current list of devices corresponding to the current system operation mode, wherein the current list of devices is among the list of devices; and instruct a driver or the one or more controllers to enter the low power state for the current list of devices based on the current system operation mode.

Example 29: The apparatus of example 28, wherein the processor circuitry is to: determine a change in the current system operation mode; and instruct the driver or the one or more controllers to exit the low power state based on the change in the current system operation mode.

Example 30: The apparatus of example 28, wherein the list of system operation modes is defined in a power management specification.

Example 31: The apparatus of example 30, wherein the list of devices is defined in the power management specification.

Example 32: The apparatus of example 28, wherein the list of system operation modes and the list of devices are modifiable.

Example 33: The apparatus of example 28, wherein the plurality of device components includes: keyboard matrix, touchpad, and camera.

Example 34: A system comprising: a memory; a processor circuitry coupled to the memory, the processor circuitry including a plurality of processor cores to execute one or more instructions; a communication interface to allow the processor circuitry to communicate with another device; and a plurality of device components communicatively coupled to the processor circuitry directly or via one or more controllers, wherein the processor circuitry is to: read a list of system operation modes of the system; read a list of devices from among the plurality of device components, wherein the list of devices corresponds to the list of system operation modes, wherein the list of devices can opportunistically enter a low power state based on the list of system operation modes; determine a current system operation mode which is among the list of system operation modes; determine a current list of devices corresponding to the current system operation mode, wherein the current list of devices is among the list of devices; and instruct a driver or the one or more controllers to enter the low power state for the current list of devices based on the current system operation mode.

Example 35: The system of example 34, wherein the processor circuitry is to: determine a change in the current system operation mode; and instruct the driver or the one or more controllers to exit the low power state based on the change in the current system operation mode.

Example 36: The system of example 34, wherein the list of system operation modes is defined in a power management specification.

Example 37: The system of example 36, wherein the list of devices is defined in the power management specification.

Example 38: The system of example 34, wherein the list of system operation modes and the list of devices are modifiable.

Example 39: The system of example 34, wherein the plurality of device components includes keyboard matrix, touchpad, and camera.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus, comprising:
an interconnect fabric;
a plurality of processor cores, wherein the plurality of processor cores are coupled to one another via the interconnect fabric;
a first wake circuitry configured to wake up a first circuitry, wherein the first wake circuitry is configured to implement a first category of wake mechanisms;
a second wake circuitry configured to wake up a second circuitry, wherein the second wake circuitry is configured to implement a second category of wake mechanisms; and
a control circuitry coupled to the first wake circuitry and the second wake circuitry, wherein the control circuitry is configured to turn off the first wake circuitry and the second wake circuitry when a processor core of the plurality of processor cores is in an active operational mode.

2. The apparatus of claim 1, further comprising a biological sensor coupled to the control circuitry, wherein:
the biological sensor is capable of detecting human activity; and
when the processor core enters a low power operational mode, the control circuitry is to turn on the biological sensor and the second wake circuitry but not the first wake circuitry.

3. The apparatus of claim 2, wherein the control circuitry is to turn on the first wake circuitry when the biological sensor detects user activity in the low power operational mode.

4. The apparatus of claim 3, wherein the low power operational mode is an S0ix state as defined by Advanced Configuration and Power Interface (ACPI) specification, or wherein the low power operational mode is a connected standby state and the active operational mode is an S0 state as defined by the ACPI specification.

5. The apparatus of claim 1, wherein an operating system, which is to execute on one or more processor cores of the plurality of processor cores, is to issue an interrupt to the control circuitry to turn on the first wake circuitry and the second wake circuitry.

6. The apparatus of claim 1, wherein the control circuitry is to send a control message to each of the first wake circuitry and the second wake circuitry to turn on or off each of the first wake circuitry and the second wake circuitry, and to receive an acknowledgment message from each of the first wake circuitry and the second wake circuitry to confirm successful reception of the control message by each of the first wake circuitry and the second wake circuitry.

7. The apparatus of claim 1, wherein to be turned on by the control circuitry, the first wake circuitry requires a user presence and the second wake circuitry does not require a user presence.

8. The apparatus of claim 1, wherein the first wake circuitry is responsive to at least one of a power button press, a keyboard press, or a touchpad activation.

9. The apparatus of claim 1, wherein the second wake circuitry is to detect a magic packet.

10. The apparatus of claim 1, wherein the second wake circuitry comprises a wake on voice wake mechanism.

11. An apparatus, comprising:
a plurality of wake circuitries including first and second wake circuitry configured to implement first and second categories of wake mechanisms, respectively;
a plurality of circuits including first and second circuits coupled to a processor, wherein the first and second wake circuitry are configured to wake up the first and second circuits, respectively; and
a control circuitry coupled to the plurality of wake circuitries, wherein the control circuitry is capable of sending control messages to the plurality of wake circuitries to turn off the first and second wake circuitry when the processor is in an active operational mode.

12. The apparatus of claim 11, further comprising a sensor hub coupled to the control circuitry, wherein the sensor hub is to provide an indication to the control circuitry about one or more sensors.

13. The apparatus of claim 12, wherein the control circuitry is to selectively turn on one or more of wake circuitries of the plurality of wake circuitries, based on a user presence detected by the sensor hub, when the apparatus is in a low power operational mode.

14. The apparatus of claim 13, wherein the low power operational mode is an S0ix state as defined by Advanced Configuration and Power Interface (ACPI) specification, or wherein the low power operational mode is a connected standby state.

15. The apparatus of claim 11, wherein the first circuit comprises at least one of a Peripheral Component Interface Express controller, a Universal Serial Bus controller, an Ethernet controller and an Audio controller.

16. A system, comprising:
a processor;
a sensor;
a first wake circuitry;
a second wake circuitry; and
a control circuitry coupled to the processor, the sensor and the first and second wake circuitries, wherein the control circuitry is to:
turn off the first and second wake circuitries when the processor is in an active operational mode; and
when the processor is in a low power operational mode, turn on the first wake circuitry if the sensor detects a user presence, turn off the first wake circuitry if the sensor does not detect the user presence, and turn on the second wake circuitry regardless of whether the sensor detects the user presence, wherein the sensor is to continuously poll for the user presence to cause the control circuitry to selectively turn on the first wake circuitry while the second wake circuitry is turned on.

17. The system of claim 16, wherein the control circuitry is to turn on the sensor when the processor enters the low power operational mode.

18. The system of claim 16, wherein the second wake circuitry is to detect a magic packet.

19. The system of claim 16, wherein the second wake circuitry comprises a wake on voice wake mechanism.

* * * * *